(No Model.) 2 Sheets—Sheet 1.
D. R. & W. A. KING.
BRETZEL OR CRACKER SIZING AND SALTING MACHINE.
No. 393,474. Patented Nov. 27, 1888.
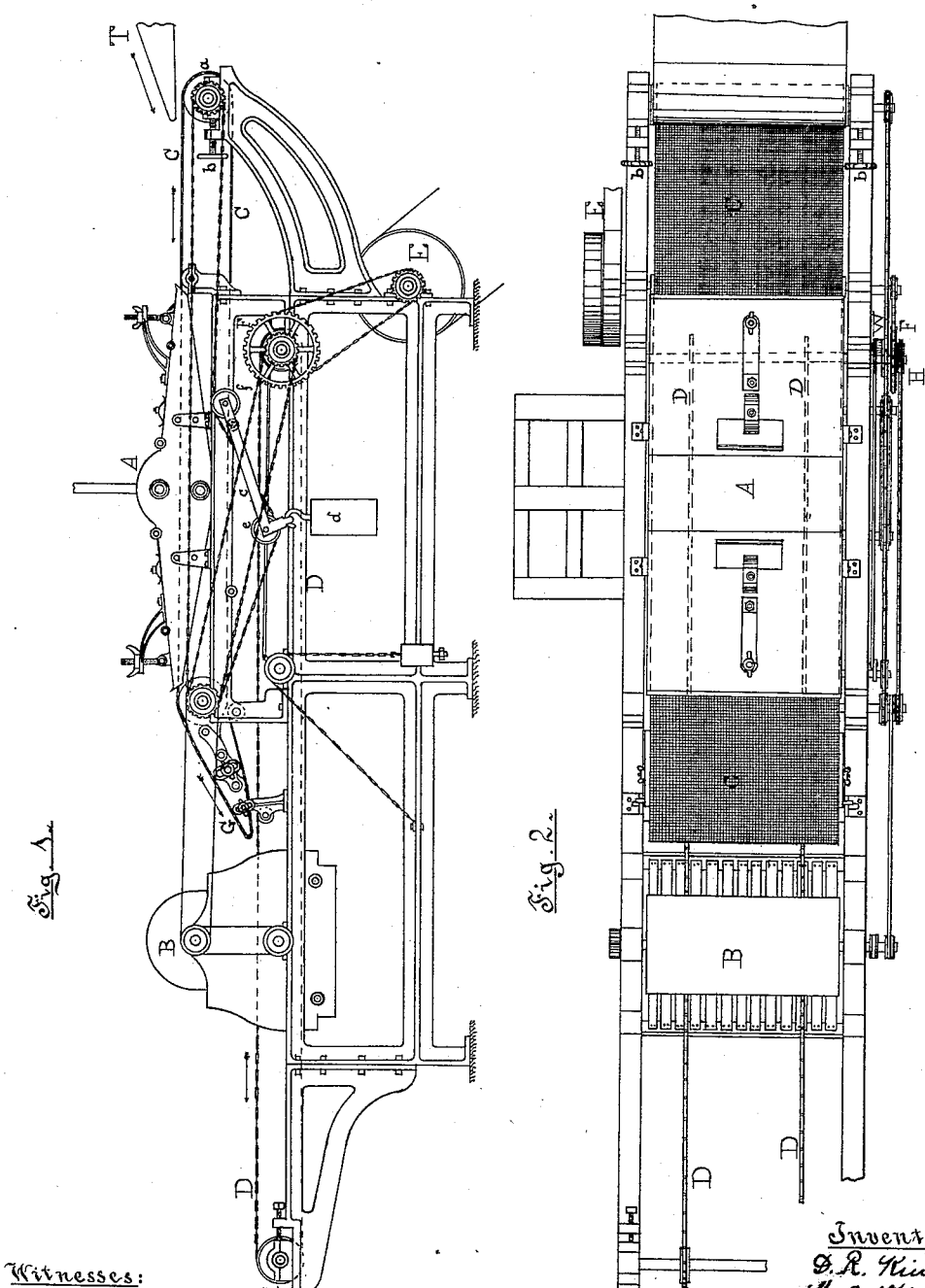
Witnesses:
N. J. Blackwood
F. Zecher
Inventor
D. R. King
W. A. King
By
D. H. Kulp & Co.
Attorneys

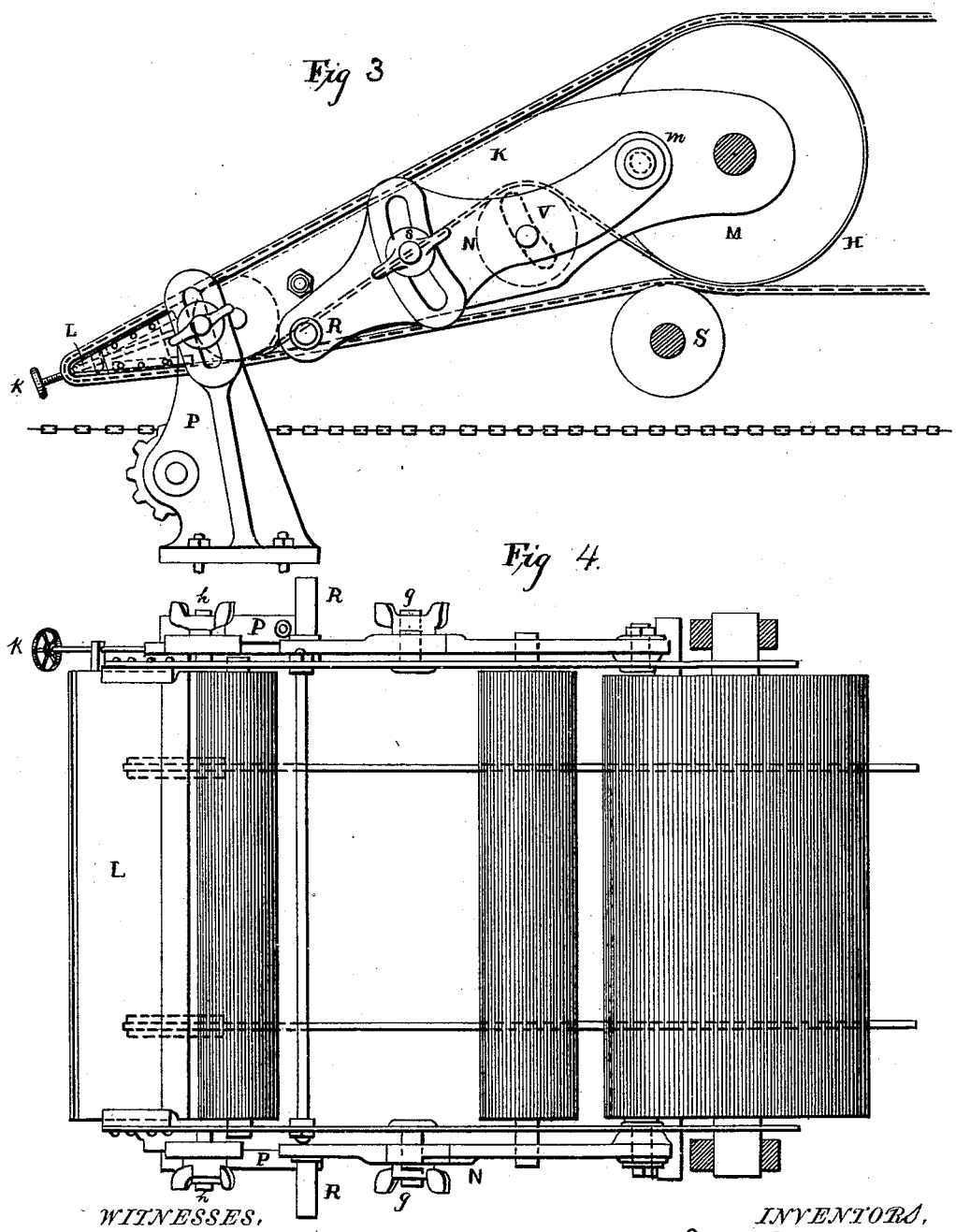

UNITED STATES PATENT OFFICE.

DANIEL R. KING, OF YORK, AND WILLIAM A. KING, OF COLUMBIA, PENNSYLVANIA.

BRETZEL OR CRACKER SIZING AND SALTING MACHINE.

SPECIFICATION forming part of Letters Patent No. 393,474, dated November 27, 1888.

Application filed October 18, 1887. Serial No. 252,702. (No model.)

*To all whom it may concern:*

Be it known that we, DANIEL R. KING, of York, in the county of York, and WILLIAM A. KING, of Columbia, in the county of Lancaster, State of Pennsylvania, have invented certain new and useful Improvements in Bretzel or Cracker Sizing and Salting Machines; and we do hereby declare the following to be a full, clear, and exact description of the invention, such as will enable others skilled in the art to which it appertains to make and use the same.

Our invention relates to improvements in bretzel or cracker sizing and salting machines; and it consists, chiefly, in the combination, with a sizing device, of an endless metallic gauze apron traveling under the same and an endless canvas apron arranged between said gauze apron and the devices supporting it, for the purpose hereinafter set forth.

The said invention also consists in certain additional features of construction and combination hereinafter set forth and claimed.

In the accompanying drawings, Figure 1 represents a side elevation of a machine embodying our invention; Fig. 2, a plan view of the same; Fig. 3, a side elevation in detail of a part of the same, and Fig. 4 a plan view of the devices shown in Fig. 3.

In Figs. 1 and 2, A represents the sizing device; B, the salting device; C, the endless gauze apron on which the substance is placed to be sized, and D D the two endless cables which receive and carry along the screens on which the substance is salted and baked. The motive power is applied at E, from which it is transferred to the toothed wheel F by means of an endless chain or belt. On either side of the wheel F, on the same shaft and revolving with it, is a toothed wheel, both of the same size, which convey the motion both to the gauze apron C and the two cables D D directly in the case of the cables and indirectly by means of an endless chain or belt to the gauze apron, thus causing them to travel at the same rate. Before the gauze apron enters the sizing device it passes over a roller, $a$, which is actuated by an endless chain. As the gauze apron passes over this roller it may have a tendency to draw over toward one side or the other and so run unevenly. To obviate this, the bearings of the roller $a$ are made adjustable by the set-screws $b\ b$, by means of which the gauze apron may be tightened on one side or the other, thus causing it to run evenly. To provide for this change of position, the endless chain which actuates this roller is made with a certain amount of slack, and this slack is made taut by the pivoted lever $c$, the weight $d$, and the rollers $e$ and $f$.

After the substance has been sized we wish to remove it from the gauze apron and place it on screens for salting and baking, to accomplish which object we have invented the following device, (shown at G in Figs. 1 and 3:) In the first place we wish the gauze apron to pass over as small a point as possible, and we also wish to make it adjustable, so that we can bring this point down as close to the screens on the endless cables as we wish, and thus transfer the substance from one to the other without breakage. This device consists, first, in two plates, K K—one on each side—pivoted to the shaft of the wheel M, with the piece of wood L attached firmly between them at the point, and, further, having lugs on the side fitted with nuts $h\ h$, which slide in slots in the supports P P, thus enabling us to place the point closer to or farther from the endless tables bearing the screens. The piece of wood in the end is made adjustable, in order to cause the apron to run evenly, by being pivoted at $l$ and having a set-screw, $k$, on the opposite side. This piece of wood is covered on its face by sheet metal, in order to allow the gauze to pass over it more freely at all times. The gauze apron passes first over the roller M, then down over the piece of wood L, returning underneath, and it is prevented from sagging, and so coming in contact with the screens, by passing over the idle-roller S and again over the roller M. Now it has been found that the friction of a metallic gauze apron, which is often used, owing to its being very porous, and hence allowing the substance acted upon to be more thoroughly saturated, is very great, and that the apron soon cracks. If we use a metallic gauze apron instead of a canvas or other fabric one, we must have some means of overcoming the friction on this apron, and for this purpose we place another smaller apron, H, of canvas, over the roller M and down over the point L under the gauze apron, thus protecting the gauze apron at all points of wear. The tightness of this canvas apron is regulated by the arms N N, pivoted at $m$, having handles at R R, and held in position by the nuts $g$ $g$, screwed on lugs attached to the plates K K, the arm bearing a roller, V, over which the canvas apron passes. We wish to state here that with the metallic gauze apron the small canvas apron is absolutely necessary. The two endless cables D D receive their motion from the wheel W, over the shaft of which they pass. They travel along, as shown in the drawings, through the salting device B and over the roller X, which is regulated by set-screws, back to the first wheel.

The operation of our machine is as follows: Let us suppose, for convenience, that the substance operated on is bretzels. The bretzels are passed onto the gauze apron C from the dough-manipulating machine. (Shown at T.) On this apron C they are carried through the sizing device A and down along the device G, which has been previously regulated by means of the nuts $h$ $h$, so that the point shall be about the distance of half a bretzel from the screens on the cables. Now when the bretzels pass down the incline, as soon as the end passes over the point, before it has had time to fall, it is caught by the screens on the endless cables traveling at the same rate, and on them carried along in the direction of the arrows through the salting device and off at the end.

Having thus described our invention and the mode of operation, we claim as new and desire to secure by Letters Patent—

1. In combination with a sizing device, an endless metallic gauze apron traveling under the same and an endless canvas apron arranged between said gauze apron and the devices supporting it, for the purpose set forth.

2. In a bretzel and cracker sizing and salting machine, the combination, with the sizing device, of an endless metallic gauze apron supported and propelled by suitable rollers and adapted to receive and carry the work operated on through said sizing device, the portion of said apron projecting through said sizing device and adapted to deposit the work on the screens being supported by an auxiliary fabric apron to prevent undue friction on said metallic gauze apron, and provided with an independent tightening-roller, as set forth, this end being further made adjustable, as heretofore described, substantially as set forth, and for the purposes described.

In testimony whereof we have hereunto subscribed our names in the presence of two subscribing witnesses.

DANIEL R. KING.
WILLIAM A. KING.

Witnesses:
J. W. STAUFFER,
C. S. KLINE.